(12) United States Patent
Németh et al.

(10) Patent No.: US 6,682,058 B1
(45) Date of Patent: Jan. 27, 2004

(54) AIR-SPRING ASSEMBLY

(75) Inventors: József Németh, Nyíregyháza (HU); Zsolt Harsányi, Nyíregyháza (HU); Zóltan Czifra, Hajdúdorog (HU); Zóltan Kriston, Nagykálló (HU)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/890,982

(22) PCT Filed: Nov. 22, 2000

(86) PCT No.: PCT/DE00/04130
§ 371 (c)(1),
(2), (4) Date: Dec. 14, 2001

(87) PCT Pub. No.: WO01/42678
PCT Pub. Date: Jun. 14, 2001

(30) Foreign Application Priority Data

Dec. 9, 1999 (DE) .................. 199 59 531

(51) Int. Cl.⁷ .................. F16F 9/04
(52) U.S. Cl. .................. 267/64.27; 267/122
(58) Field of Search .................. 267/64.23, 64.24, 267/64.27, 120, 122, 139, 140; 403/50

(56) References Cited

U.S. PATENT DOCUMENTS

| | | | | | |
|---|---|---|---|---|---|
| 3,475,015 | A | * | 10/1969 | Hirst | 267/64.24 |
| 4,564,177 | A | * | 1/1986 | Leonard | 267/64.24 |
| 5,470,096 | A | | 11/1995 | Baxter | |
| 5,941,510 | A | * | 8/1999 | Grass et al. | 267/64.27 |
| 6,024,343 | A | * | 2/2000 | Ebert | 267/64.27 |
| 6,123,325 | A | * | 9/2000 | Buchanan et al. | 267/122 |
| 6,460,836 | B1 | * | 10/2002 | Trowbridge | 267/64.27 |

FOREIGN PATENT DOCUMENTS

| | | |
|---|---|---|
| DE | 33 45 536 | 6/1985 |
| DE | 295 10 199 | 8/1995 |
| DE | 198 26 480 | 6/1998 |
| DE | 100 30 679 | 6/2000 |
| EP | 0 123 171 | 10/1984 |
| EP | 0 501 043 | 9/1992 |
| EP | 0 645 554 | 3/1995 |
| EP | 0969 223 | 1/2000 |
| EP | 0 969 224 | 1/2000 |
| EP | 0 943 836 | 5/2001 |
| FR | 2 093 330 | 1/1972 |
| JP | 51 132379 | 11/1976 |
| WO | WO 00 70 238 | 11/2000 |

* cited by examiner

Primary Examiner—Jack Lavinder
Assistant Examiner—Thomas J. Williams
(74) Attorney, Agent, or Firm—Collard & Roe, P.C.

(57) ABSTRACT

The invention relates to an air-spring assembly (1"), comprising at least the following components: air-spring bellows (2") consisting of an elastomeric material which encompass an expandable air-spring inner chamber (3"); an air-spring cover, to which one end of the air-spring bellows is fixed; an air-spring piston (5"), to which the opposite end of the air-spring bellows is fixed using a connecting element; in addition to a buffer. The inventive air-spring assembly (1") is characterized in that the connecting element for the air-spring bellows on the air-spring piston and the buffer are configured as one piece in the form of a combination system (13), which both secures and acts as a buffer. The invention also relates to advantageous embodiments of the assembly.

6 Claims, 3 Drawing Sheets

AIR-SPRING ASSEMBLY

CROSS REFERENCE TO RELATED APPLICATIONS

Figure 1:
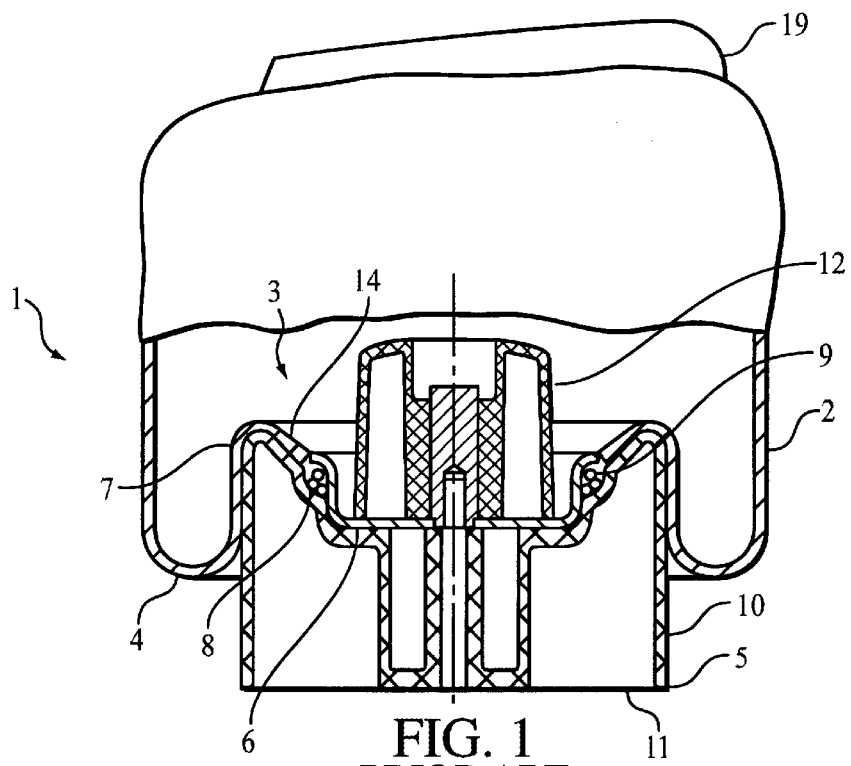

Applicants claim priority under 35 U.S.C. §119 of German Application No. 199 59 531.3, filed on Dec. 9, 1999. Applicants also claim priority under 35 U.S.C. §120 of PCT/DE00/04130, filed on Nov. 22, 2000. The international application under PCT article 21(2) was not published in English.

Description

The invention relates to an air spring assembly at least comprising the following components, specifically an air spring bellows made of elastomer material and comprising an air spring inner chamber with an elastic volume, whereby the air spring bellows is provided with an embedded reinforcement in most cases;

an air spring cover on which the one end of the air spring bellows is secured;

an air spring piston comprised of
  a face area that is arranged opposite the air spring cover;
  a piston edge that defines the face area on the outer side, whereby the other end of the air spring bellows is turned inside out over the edge of the piston and merges into a mostly thickened fastening zone which in turn is secured on the air spring piston in a clamped manner by means of a tying element within the face area of said piston;
  a lateral roll-off surface on which the air spring bellows is capable of rolling off, forming a rolling fold; and
  a base area;

as well as a buffer that is arranged within the face area of the air spring piston.

An air spring assembly of the type specified above, which is frequently briefly referred to as an air spring, is described in the published patent documents EP-A-0 943 836, EP-A-0 969 223 and EP-A-0 969 224, notably with the following special constructional features:

The tying element for tying the air spring bellows to the air spring piston is made of metal and realized in the form of a cap, for example in the form of a mountable closing cap; and The buffer, which is embedded within the face area of the air spring piston in the cap-shaped tying element, secures the pneumatic spring in case the air spring bellows is damaged or inoperative over a longer period of time.

Now, some automobile manufacturers wish to delimit with the air spring the maximum outer position of the chassis. This leads to the fact that the air spring is heavily loaded by the weight of the axle, the tires and the brake assembly. In addition, against the background of rising price pressure, some suppliers of automakers are forced to look for other possibilities available at more favorable cost while offering at the same time high technical efficiency.

Now, based on the problems outlined above, the air spring assembly according to the invention is characterized in that the tying element for tying the air spring bellows to the air spring piston and the buffer realized in the form of a securing and buffering combination system form one single structural component.

Useful further developments of the air spring assembly as defined by the invention are discussed below.

Figure 2:
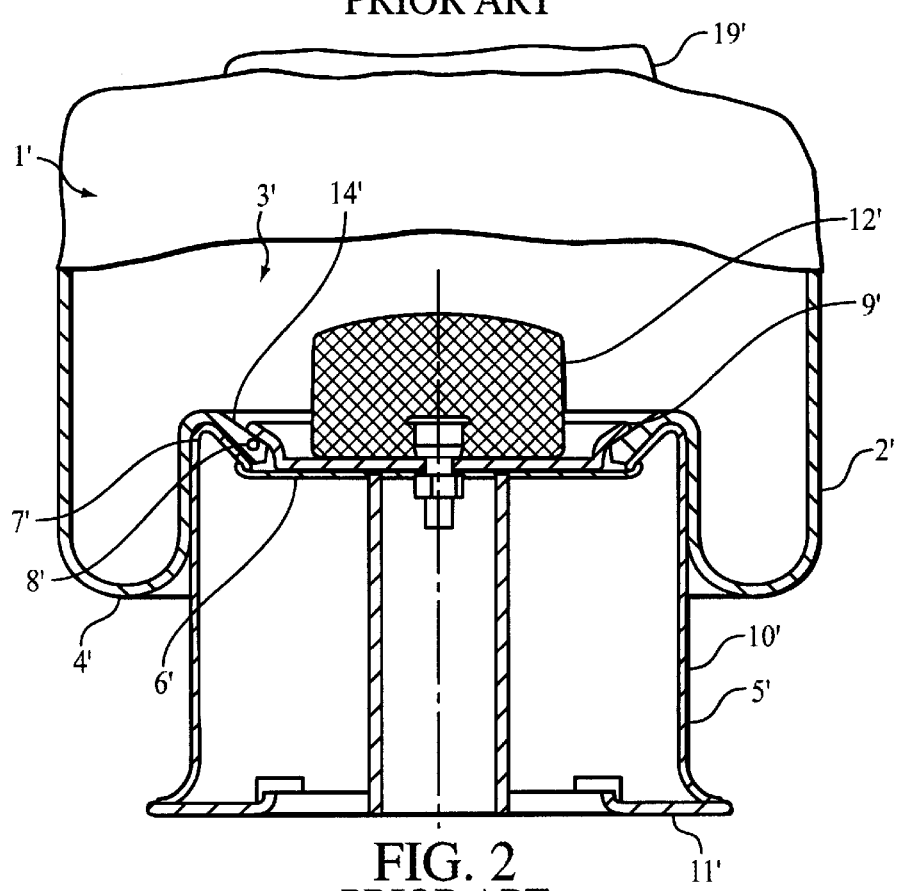
Figure 3:
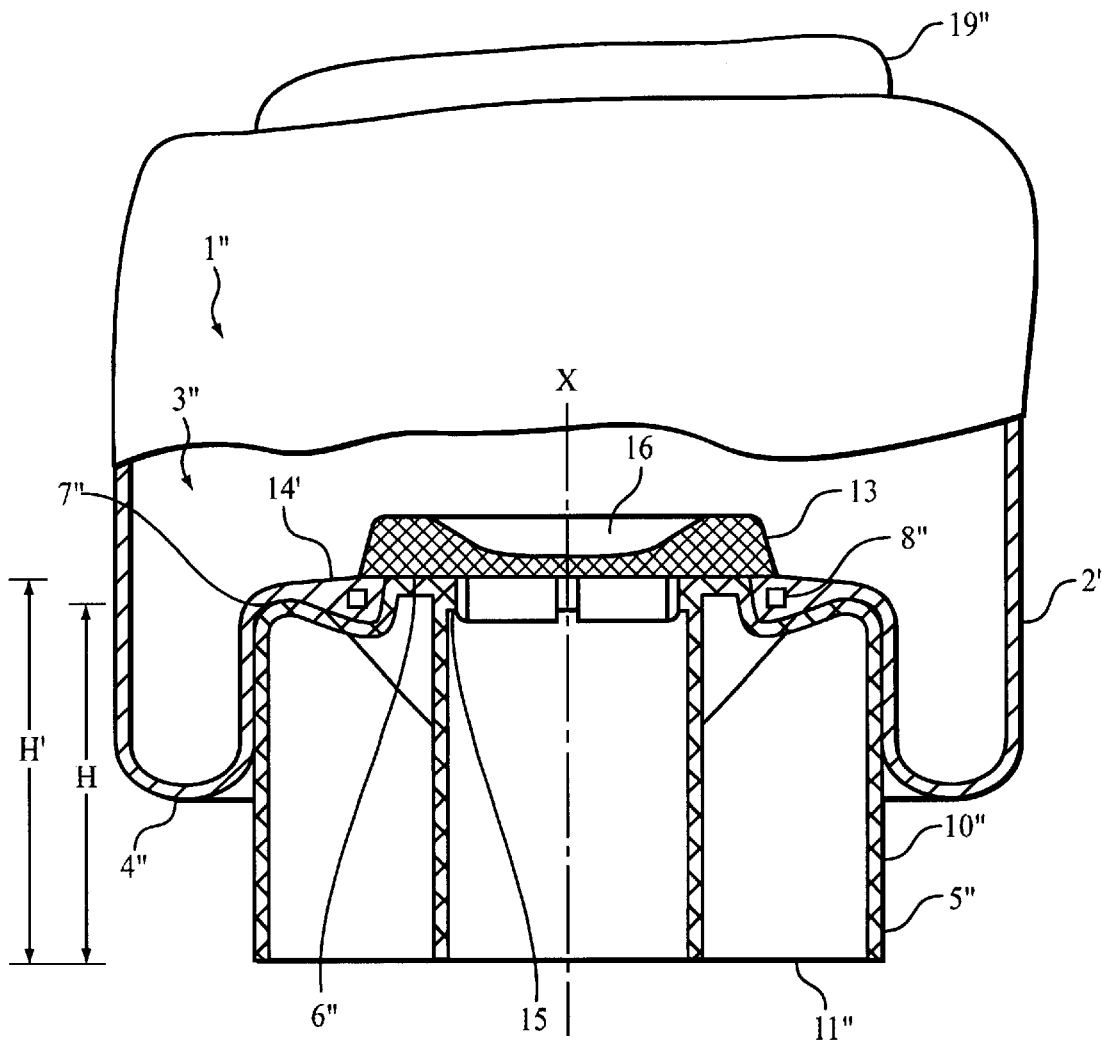
Figure 4:
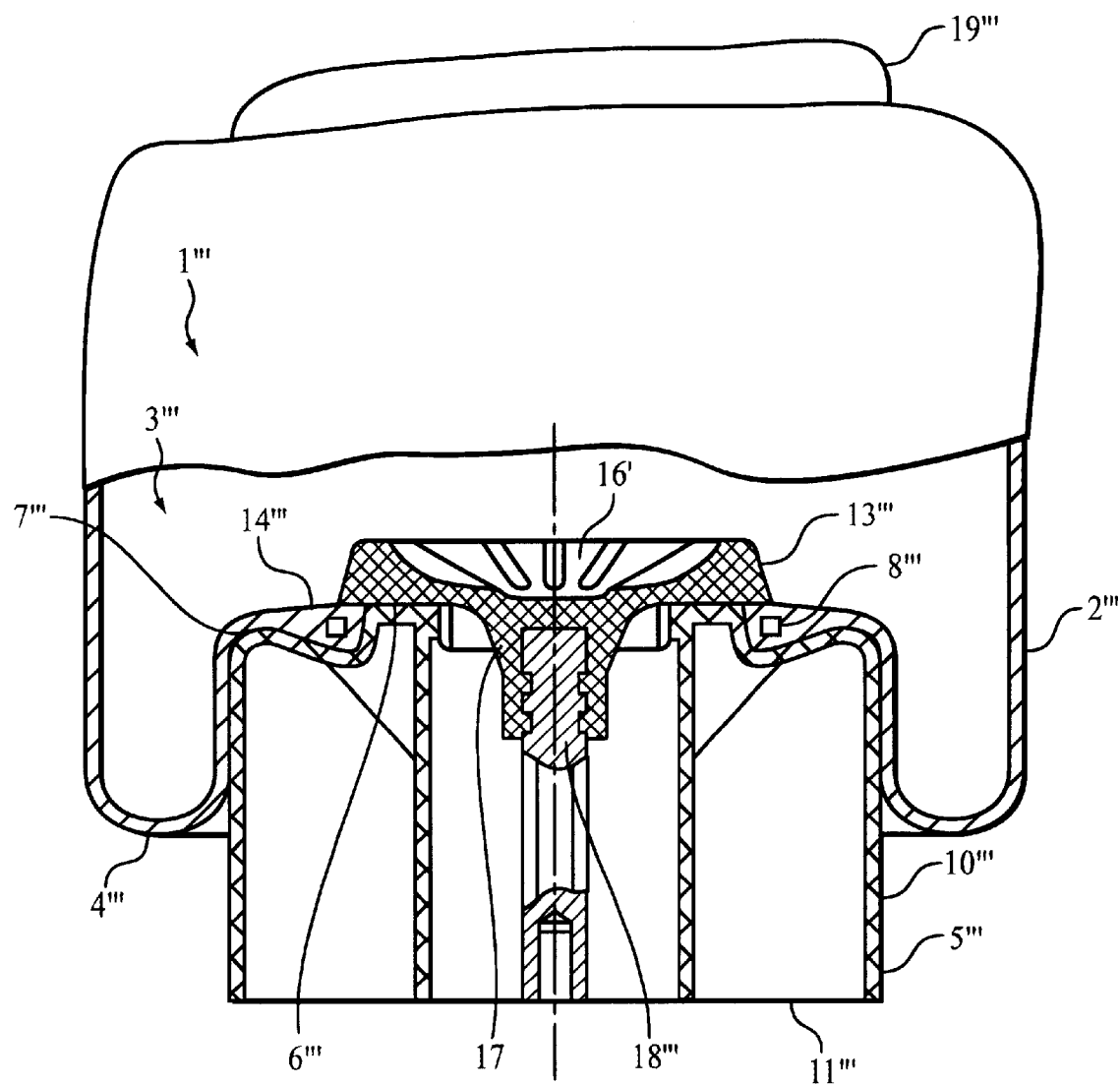

The invention is explained in the following with the help of comparative examples and exemplified embodiments and by reference to schematic drawings, in which:

FIGS. 1 and 2 show two comparative examples of an air spring assembly according to the state of the art, using a cap-shaped tying element with an embedded buffer; and FIGS. 3 and 4 show two exemplified embodiments of the air spring assembly as defined by the invention, u sing the novel combination system.

The following list of reference symbols applies in connection with the above figures:

1,1',1",1''' Air spring assembly
2,2',2",2''' Air spring bellows made of elastomer material
3,3',3",3''' Inner chamber of air spring with elastic volume
4,4',4",4''' Rolling fold
5,5',5",5''' Air spring piston
6,6',6",6''' Face area of air spring piston
7,7',7",7''' Edge of piston
8,8',8",8''' Fastening area of air spring bellows
9,9' Cap-shaped tying element made of metal
10,10',10",10''' Roll-off surface of air spring piston
11,11',11",11''' Base area of air spring piston
12 Buffer made of plastic
12' Buffer made of elastomer material
13, 13' Securing and buffering combination system
14,14',14",14''' Edge of fastening area of air spring bellows
15 Recessed part of combination system
16, 16' Funnel-shaped deepening
17 Inner housing of combination system
18 Screw system
19,19',19",19''' Cover FIG. 1 shows an air spring assembly 1 comprised of at least the following components:

An air spring bellows 2 made of elastomer material and enclosing an air spring inner chamber 3 with an elastic volume, whereby the air spring bellows is provided with an embedded reinforcement in most cases;

an air spring cover 19 on which the one end of the air spring bellows is secured, for example by means of a clamping ring or a flange system;

an air spring piston 5 comprising
  a face area 6 that is arranged opposite the air spring cover
  a piston edge 7 that defines the face area on the outer side, whereby the other end of the air spring bellows is turned inside out over the piston edge and merges in this connection into a thickened fastening zone 8, which in turn is secured in a clamping manner by means of a tying element 9 on the air spring piston within the face area of the latter;
  a lateral roll-off surface 10, on which the air spring bellows is capable of rolling off, forming a rolling fold 4; and
  a base area 11, which in turn is connected with the chassis by means of an additional structural component (DE-A-100 30 679); as well as
a buffer 12, which is arranged within the face area of the air spring piston.

This basic constructional concept is the basis for the air spring assemblies 1', 1" and 1''' according to FIGS. 2 to 4 as well, so that only the differences are addressed in greater detail in the following.

According to FIG. 1, the tying element 9 for tying the air spring bellows 2 to the air spring piston 5 is made of metal and realized in the form of a cap. The buffer 12 is made of plastic and is embedded within the face area 6 in the cap-shaped tying element 9. Within the thickened fastening zone 8 of the air spring bellows, the tying element is attached by vulcanization.

The edge 14 of the fastening zone 8 of the air spring bellows facing the inner chamber 3 of the air spring is arranged at a lower level than the edge 7 of the piston.

FIG. 2 shows an air spring assembly 1' which, with respect to FIG. 1, is substantially different only on account of the fact that the buffer 12', the latter being embedded in the cap-shaped tying element 9', is made of an elastomer material, in association with another type of tying construction on the air spring piston 5' that makes use of a mountable closing cap.

Now, FIG. 3 shows an air spring assembly 1" in which the tying element for tying the air spring bellows 2" to the air spring piston 5", and the buffer in the form of a securing and buffering combination system 13 form one-single structural component.

With respect to the base area 11" of the air spring piston 5", the height "H" of the piston edge 7", as opposed to the comparative examples according to FIGS. 1 and 2, is in the present case smaller than the height "H'" of the edge 14" of the fastening zone 8" of the air spring bellows 2", said edge 14" facing the inner chamber 3" of the air spring. After the combination system 13 has been secured on the air spring piston 5" by means of a recessed part 15, the edge 14" of the fastening zone 8" is forced into a compressed, tensioned position that assures particularly effective locking and, furthermore, airtightness.

The combination system 13 can be secured on the air spring piston 5" also with a rotary closure instead of using the recessed part 15.

The concept of the novel combination system 13 shown in FIG. 3 is suited to be employed for an air spring assembly with an integrated vibration damper (shock absorber) that connects the air spring cover with the air spring piston along the axis "X" of the air spring. Such a vibration damper is described, for example in published patent document DE-A-198 26 480.

FIG. 4 shows an air spring assembly 1''' in which the combination system 13' comprises an inner housing 17 with an integrated screw system 18, which penetrates the core area of the air spring piston 5''', securing the latter.

The exemplified embodiment according to FIG. 4 comes to bear primarily in connection with air spring assemblies not comprising any vibration damper.

Furthermore, the following material and construction parameters apply with respect to the combination systems 13 and 13' according to FIGS. 3 and 4, respectively:

The combination system is made of an elastomer material or plastic exhibiting at the same time securing and buffering properties;

The combination system has a funnel-shaped deepening 16 and 16', respectively, located within the contact area of the air spring inner chamber 3" and, respectively 3''', that extends substantially centrally around the axis "X" of the air spring. A material saving is connected with said measure without impairing the effect of the combination system 13 or 13', respectively.

What is claimed is:

1. An air spring assembly comprising:
   (a) an air spring bellows made of elastomer material that encloses an air spring inner chamber having an elastic volume;
   (b) air spring cover on which the one end of the air spring bellows is secured;
   (c) an air spring piston comprising
      (i) a face area arranged opposite the air spring cover;
      (ii) a piston edge defining the face area on the outer side, whereby the other end of the air spring bellows is turned inside out over the edge of the piston and merges into a mostly thickened fastening zone, which in turn is secured in a clamping manner on the air spring piston within the face area of the latter by means of a tying element;
      (iii) a lateral roll-off surface on which the air spring bellows is capable of rolling off, forming a rolling fold;
      (iv) a base area; and
   (d) a buffer that is arranged within the face area of the air spring piston;
      wherein the tying element for tying the air spring bellows to the air spring piston and the buffer in the form of a securing and buffering combination system are one single structural component made from an elastomeric or plastic material; and
      wherein with respect to the base area of the air spring piston, the height (H) of the piston edge is smaller than the height (H') of the edge of the fastening zone of air spring bellows facing the air siring inner chamber.

2. The air spring assembly according to claim 1, wherein the combination system is secured on the air spring piston by means of a recessed part.

3. The air spring assembly according to claim 1, wherein the combination system is secured on the air spring piston by means of a rotary closure.

4. The air spring assembly according to claim 1, wherein the combination system comprises an inner housing with an integrated screw system penetrating the core zone of the air spring piston to secure said air spring piston.

5. The air spring assembly according to claim 1, wherein the combination system has a funnel-shaped deepening in a contact area of the air spring inner chamber, said deepening substantially extending centrally around the air spring axis (X).

6. The air spring assembly according to claim 1 wherein said air spring bellows is provided with an embedded reinforcement.

* * * * *

UNITED STATES PATENT AND TRADEMARK OFFICE
CERTIFICATE OF CORRECTION

PATENT NO.   : 6,682,058 B1
DATED        : January 27, 2004
INVENTOR(S)  : Nemeth et al.

It is certified that error appears in the above-identified patent and that said Letters Patent is hereby corrected as shown below:

Column 4,
Line 34, after the word "air" (second occurrence), please change the word "siring" to -- spring --.

Signed and Sealed this

Eighteenth Day of May, 2004

JON W. DUDAS
*Acting Director of the United States Patent and Trademark Office*